Patented Apr. 18, 1939

2,154,922

UNITED STATES PATENT OFFICE 2,154,922

SULPHONATED ORGANIC COMPOUNDS AND METHOD OF MAKING THEM

Edmund Waldmann, Klosterneuburg, and August Chwala, Vienna, Austria, assignors to I. G. Farbenindustrie Aktiengesellschaft, Frankfort-on-the-Main, Germany No Drawing. Application December 16, 1937, Serial No. 180,158. In Austria December 18, 1936

10 Claims. (Cl. 260—309)

This invention relates to compounds containing sulphuric acid radicals and especially those containing nitrogen, besides the sulphuric acid radicals and to a process of preparing such compounds.

We have found that valuable products may be obtained by causing halogen-sulphonic acids or halogen-sulphuric acid esters containing hydroxy groups to act upon imidazolines of high molecular weight, i. e. such as contain at least 10 carbon atoms.

High-molecular imidazolines suitable for use are, for instance, nonyl-imidazoline, undecyl-imidazoline, tridecyl-imidazoline, pentadecyl-imidazoline, heptadecyl-imidazoline, heptadecenyl-imidazoline and the like. These imidazolines are derived from fatty acids of high molecular weight. For the reaction with halogen-sulphonic acids or halogen-sulphuric acid esters, containing hydroxy groups, there are not only suitable the pure imidazolines, but there may also be started, in the manufacture of imidazolines, from commercial mixtures of fatty acids as they are, for instance, present in the natural fats, oils or waxes or may be obtained by oxidation of paraffin or paraffin oil. The imidazolines may still contain other substituents, provided that the hydrogen atom present at the nitrogen atom in 1-position be preserved.

As halogen-hydroxy-sulphonic acids there may especially be used aliphatic halogen-hydroxysulphonic acids, particularly those in which the halogen atom and the hydroxyl group are in adjacent position to each other, for instance, beta-chloro-alpha-hydroxypropane-sulphonic acid. The halogen-hydroxy-sulphonic acids may be prepared by causing di- or poly-halogen-hydrins of poly-hydric alcohols to react with sodium sulphite. One or several sulphonic acid groups may thus be introduced.

Suitable halogen-hydrins are, for instance, obtained by causing hydrogen halide to act upon aliphatic poly-hydroxy compounds, such as glycerol, erytritol, mannitol, polyglycerol. Halogen-hydroxy-sulphonic acids may, furthermore, be obtained from unsaturated aliphatic sulphonic acids, for instance, allyl-sulphonic acid, by addition of hypochlorous acid.

Instead of the above sulphonic acids there may also be used the corresponding sulphuric acid esters which may be prepared, by esterification with sulphuric acid, from halogen-hydrins of poly-hydric alcohols.

Sulphonic acids of imidazolines of high molecular weight may be prepared in an especially smooth way by causing the imidazoline base to react, in the absence of water and at temperatures comprised between 100° C. and 220° C., preferably between 130° C. and 190° C., with the finely powdered salt of a halogen-sulphonic acids or halogen-sulphuric acid esters.

Instead of the imidazoline bases there may also be used as parent materials the salts of the imidazolines, especially the hydrochlorides, by liberating therefrom the imidazoline, by addition of anhydrous sodium acetate or anhydrous salts having an alkaline action, such as sodium carbonate, borax, trisodium phosphate, and then causing the imidazoline to react with the halogen-hydroxysulphonic acid.

The condensation products may serve as wetting, dispersing, cleansing and foaming agents. They may further be used as levelling agents in the dyeing industry or as auxiliary agents in the stripping of vat dyestuffs by reduction.

The following examples serve to illustrate the invention, but they are not intended to limit it thereto; the parts are by weight:

(1) 100 parts of pentadecyl-imidazoline and 102 parts of sodium beta-chloro-alpha-hydroxy-propane-sulphonate (of about 70 per cent. strength) are heated at 150° C.–170° C. until a test portion dissolves, after neutralizing, in water to a clear solution.

The solution of the sodium pentadecyl-imidazolinyl-hydroxypropane-sulphonate has a strong wetting, foaming and washing power.

When treating skin-wool, at 50° C., with a bath containing per liter one gram of sodium pentadecyl-imidazolinyl - hydroxypropane - sulphonate and 2 grams of calcined sodium carbonate, it becomes perfectly white.

(2) 11.1 parts of heptadecenyl-imadazoline are mixed with 11.6 parts of powdered sodium chloro - hydroxypropane-sulphonate of 92 per cent. strength, both being as anhydrous as possible, and the mixture is heated, while stirring, to 160° C.–180° C. The reaction is complete as soon as a test portion of the melted mass dissolves in water, with addition of some sodium carbonate or ammonia, to a clear solution, this being the case after 1–1½ hours. 2.7 parts of calcined, finely powdered sodium carbonate are then stirred into the thickish mass, the reaction mixture which has become foamy is stirred for about 1–2 minutes and then allowed to cool. A light-brownish mass is obtained which easily dissolves in water.

(3) 224 grams of undecyl-imidazoline are melted and there is introduced into the molten mass, at 110° C.–120° C., a mixture consisting of 233 grams of the sodium salt of the monosulphuric acid ester of gamma-chloro-propylene-glycol and of 60 grams of sodium carbonate. The mixture is intensely mixed, while stirring, until a test portion is completely soluble in water. The crude product may be recrystallized from methanol.

We claim:

1. The process of producing an imidazoline substituted in the imino group which comprises causing an imidazoline having in 2-position an aliphatic radical of at least 7 carbon atoms to react with a member of the group consisting of aliphatic halogen-hydroxy-sulphonic acids and halogen-hydroxy-sulphuric acid esters, hydrogen halide being eliminated.

2. The process of producing an imidazoline substituted in the imino group which comprises causing an imidazoline having in 2-position an aliphatic radical of at least 7 carbon atoms to react with beta-chloro-alpha-hydroxy-propane-sulphonic acid, hydrogen chloride being eliminated.

3. The process of producing an imidazoline substituted in the imino group which comprises causing an imidazoline having in 2-position an aliphatic radical of at least 7 carbon atoms to react with the sulphuric acid ester of gamma-chloropropylene-glycol, hydrogen chloride being eliminated.

4. The process of producing an imidazoline substituted in the imino group which comprises causing 2-pentadecyl-imidazoline to react with beta-chloro-alpha-hydroxy-propane-sulphonic acid, hydrogen chloride being eliminated.

5. The process of producing an imidazoline substituted in the imino group which comprises causing 2-heptadecenyl-imidazoline to react with beta-chloro-alpha-hydroxy-propane-sulphonic acid, hydrogen chloride being eliminated.

6. The process of producing an imidazoline substituted in the imino group which comprises causing 2-undecyl-imidazoline to react with the sulphuric acid ester of gamma-chloropropylene-glycol, hydrogen chloride being eliminated.

7. As new products imidazolines having in 2-position an aliphatic radical of at least 7 carbon atoms substituted in the imino group by a member of the group consisting of the radicals of aliphatic sulphonic acids and sulphuric acid esters containing hydroxy groups.

8. Pentadecyl-imidazoline-N-hydroxypropane-sulphonic acid of the formula:

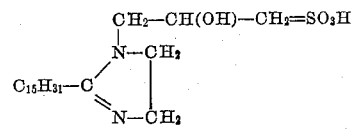

9. Heptadecenyl-imidazoline-N-hydroxy-propane-sulphonic acid of the formula:

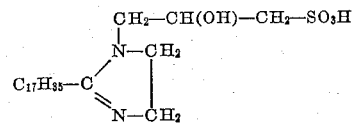

10. Undecyl-imidazoline-N-hydroxy-propane-sulphuric acid ester of the formula:

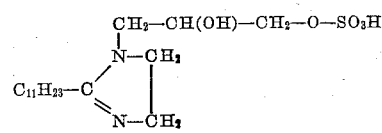

EDMUND WALDMANN.
AUGUST CHWALA.